United States Patent
Owens et al.

(10) Patent No.: US 12,361,949 B2
(45) Date of Patent: Jul. 15, 2025

(54) DYNAMIC AUDIO SIGNAL TRANSCRIPTION IN A VEHICLE

(71) Applicant: GM GLOBAL TECHNOLOGY OPERATIONS LLC, Detroit, MI (US)

(72) Inventors: Kevin W. Owens, Sterling Heights, MI (US); Eric T. Hosey, Rochester Hills, MI (US); Gaurav Talwar, Novi, MI (US); Russell A. Patenaude, Macomb Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 258 days.

(21) Appl. No.: 18/324,193

(22) Filed: May 26, 2023

(65) Prior Publication Data

US 2024/0395252 A1    Nov. 28, 2024

(51) Int. Cl.
  *G10L 15/26*    (2006.01)
  *G01C 21/36*    (2006.01)
  *G06T 11/60*    (2006.01)
  *H04W 4/40*    (2018.01)

(52) U.S. Cl.
  CPC ............ *G10L 15/26* (2013.01); *G01C 21/36* (2013.01); *G06T 11/60* (2013.01); *H04W 4/40* (2018.02)

(58) Field of Classification Search
  None
  See application file for complete search history.

(56) References Cited

U.S. PATENT DOCUMENTS

| | | | | |
|---|---|---|---|---|
| 6,958,707 B1 * | 10/2005 | Siegel | .................... | G08G 1/087 340/902 |
| 7,103,460 B1 * | 9/2006 | Breed | .................... | G07C 5/008 706/15 |
| 9,213,522 B2 * | 12/2015 | Prakah-Asante | ..... | B60W 40/09 |
| 2009/0024707 A1 * | 1/2009 | Aase | ........................ | G10L 13/00 704/235 |
| 2012/0028682 A1 * | 2/2012 | Danne | .................... | B60R 11/02 455/557 |
| 2014/0032112 A1 * | 1/2014 | Hansen | .................... | B60R 1/12 701/538 |
| 2014/0310610 A1 * | 10/2014 | Ricci | ...................... | H04L 67/12 715/744 |
| 2017/0169625 A1 * | 6/2017 | Lavie | .................... | G08G 1/0141 |
| 2020/0329103 A1 * | 10/2020 | Tan | .......................... | H04L 67/12 |
| 2021/0133290 A1 * | 5/2021 | Makke | ..................... | G10L 15/22 |
| 2021/0358492 A1 * | 11/2021 | Kim | .......................... | B60W 50/10 |
| 2022/0332190 A1 * | 10/2022 | Yao | ......................... | H04N 5/272 |
| 2023/0399102 A1 * | 12/2023 | Thomas | .................. | A61P 17/08 |
| 2024/0278717 A1 * | 8/2024 | Anderson | ............... | G10L 13/04 |

* cited by examiner

Primary Examiner — Neeraj Sharma
(74) Attorney, Agent, or Firm — Quinn IP Law

(57) ABSTRACT

A system for providing hearing accessibility for an occupant in a vehicle includes at least one display unit operatively connected to the vehicle. The at least one display unit has multiple sections, including a media screen adapted to display video content and a plurality of text boxes. A controller is in electronic communication with the at least one display unit, the controller being adapted to selectively execute a dictation engine. The controller has a processor and tangible, non-transitory memory on which instructions are recorded. The controller is adapted to receive audio input data from a plurality of sources. The controller is adapted to generate respective transcribed data from the audio input data, via the dictation engine. The respective transcribed data is displayed in the plurality of text boxes.

16 Claims, 3 Drawing Sheets

DYNAMIC AUDIO SIGNAL TRANSCRIPTION IN A VEHICLE

INTRODUCTION

The present disclosure relates generally to a system and method of providing hearing accessibility for an occupant in a vehicle. More specifically, the disclosure relates to dynamic audio signal transcription in a vehicle with a multi-section display. It is an undeniable facet of modern life that many people spend a considerable amount of time in their vehicles, while being transported from one place to another. Many vehicles are equipped with generous infotainment, educational and media streaming services. However, those amongst us with hearing challenges may not be able to fully access the services available in a vehicle.

SUMMARY

Disclosed herein is a system for providing hearing accessibility for an occupant in a vehicle. The system includes at least one display unit ("at least one" omitted henceforth) operatively connected to the vehicle. The display unit has multiple sections, including a media screen adapted to display video content and a plurality of text boxes. A controller is in electronic communication with the display unit, the controller being adapted to selectively execute a dictation engine. The controller has a processor and tangible, non-transitory memory on which instructions are recorded. The controller is adapted to receive audio input data from a plurality of sources. The controller is adapted to generate respective transcribed data from the audio input data, via the dictation engine. The respective transcribed data is displayed in the plurality of text boxes.

The plurality of text boxes may include a media text box adapted to display the respective transcribed data associated with the video content on the media screen. In some embodiments, the plurality of sources includes at least one microphone ("at least one" omitted henceforth) adapted to capture the audio input data in or around the vehicle. The plurality of text boxes includes a vehicle audio text box adapted to display the respective transcribed data based in part on the audio input data captured by the microphone.

In some embodiments, the controller is adapted to display a vehicle layout overlay in the at least one display unit. The vehicle layout overlay includes respective symbols representing occupants of the vehicle, with the respective symbols being updated in real time to identify the occupants associated with the respective transcribed data in the vehicle audio text box. The microphone may be adapted to be selectively muted or selectively activated based on input from the occupant.

In some embodiments, the plurality of text boxes includes a message text box adapted to display one or more messages from the controller requesting input from the occupant. The plurality of text boxes may include a navigation text box displaying vehicle route information, including an upcoming navigation maneuver of the vehicle and a planned stop. The vehicle route information includes an estimated time of arrival of the vehicle at a predefined destination and a remaining power level of the vehicle at the predefined destination. The controller may be adapted to selectively transmit the respective transcribed data to a personal smart device and/or a remote advisory unit.

In some embodiments, the video content includes at least one of a podcast and a documentary. The controller may be adapted to selectively display a summary of the video content in one of the plurality of text boxes. The controller may be adapted to selectively archive the respective transcribed data.

Disclosed herein is a method of providing hearing accessibility for an occupant in a vehicle. The vehicle has at least one display unit, and a controller having a processor and tangible, non-transitory memory on which instructions are recorded. The method includes incorporating multiple sections in the at least one display unit, including a media screen adapted to display video content and a plurality of text boxes. The method includes receiving audio input data from a plurality of sources, via the controller, and selectively executing a dictation engine, via the controller, to generate respective transcribed data from the audio input data in real-time. The method includes displaying the respective transcribed data in the plurality of text boxes.

The above features and advantages and other features and advantages of the present disclosure are readily apparent from the following detailed description of the best modes for carrying out the disclosure when taken in connection with the accompanying drawings.

Figure 1:
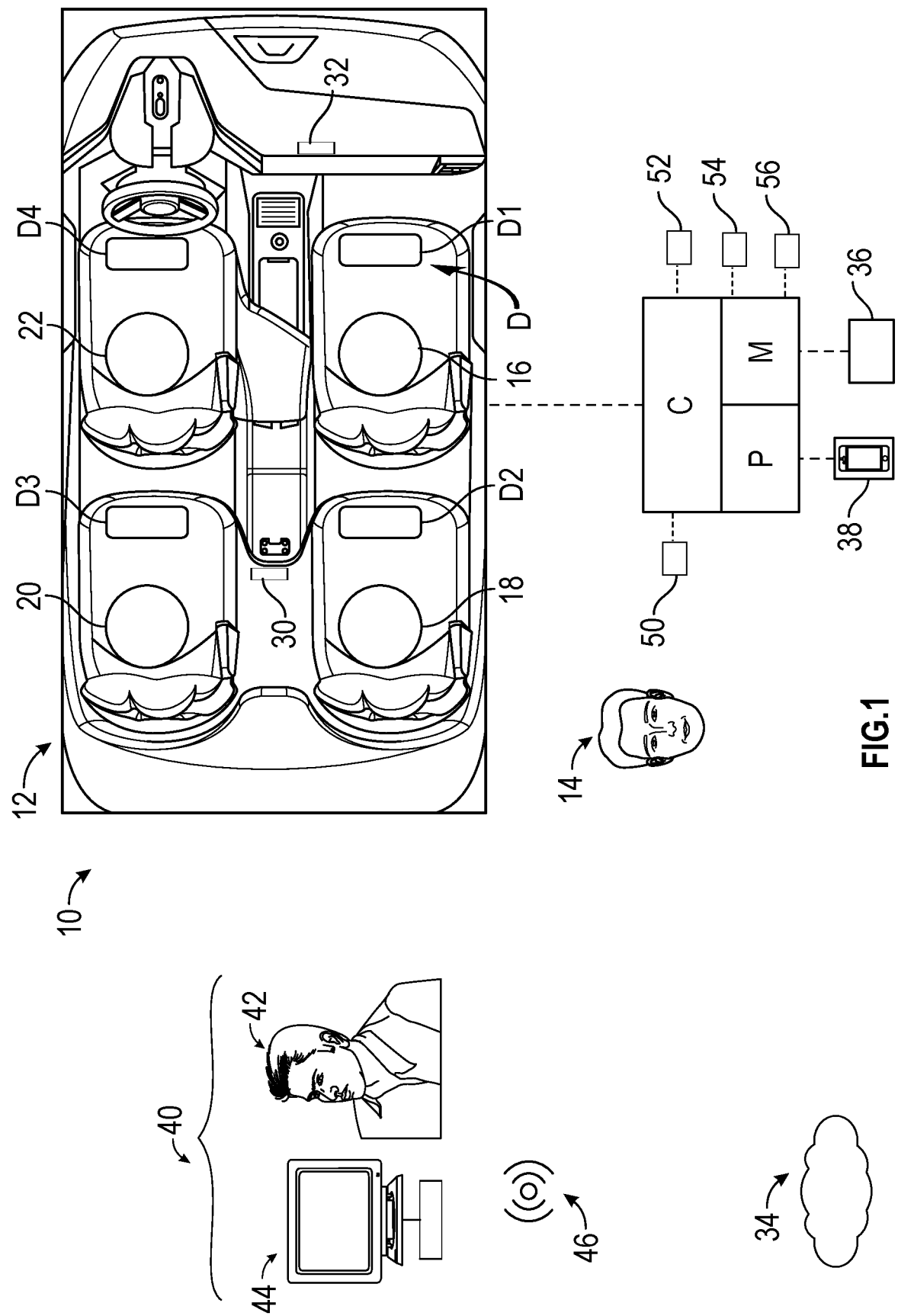
FIG. 1 is a schematic diagram of a system for providing hearing accessibility for an occupant in a vehicle, the system having a controller.

Representative embodiments of this disclosure are shown by way of non-limiting example in the drawings and are described in additional detail below. It should be understood, however, that the novel aspects of this disclosure are not limited to the particular forms illustrated in the above-enumerated drawings. Rather, the disclosure is to cover modifications, equivalents, combinations, sub-combinations, permutations, groupings, and alternatives falling within the scope of this disclosure as encompassed, for instance, by the appended claims.

DETAILED DESCRIPTION

Referring to the drawings, wherein like reference numbers refer to like components, FIG. 1 schematically illustrates a system 10 for providing hearing accessibility for an occupant 14 in a vehicle 12. The vehicle 12 may include, but is not limited to, a passenger vehicle, sport utility vehicle, light truck, heavy duty vehicle, minivan, bus, transit vehicle, bicycle, moving robot, farm implement (e.g., tractor), sports-related equipment (e.g., golf cart), boat, plane, train or another moving platform. The vehicle 12 may be an autonomous vehicle and/or an electric vehicle, which may be purely electric or partially electric. It is to be understood that the vehicle 12 may take many different forms and have additional components.

Referring to FIG. 1, the system 10 includes a controller C with at least one processor P and at least one memory M (or non-transitory, tangible computer readable storage medium) on which instructions may be recorded for operating an accessibility mode 50. The memory M may store controller-executable instruction sets, and the processor P may execute the controller-executable instruction sets stored in the memory M.

As described below, the accessibility mode 50 provides a mechanism to dynamically convert audio signals, from various sources outside and/or inside the vehicle 12, into text that is subsequently transmitted for display in at least one display unit D operatively connected to the vehicle 12. Accordingly, the system 10 provides the benefit of a full immersive experience for the occupant 14, who may have hearing challenges, and is in proximity to the display unit D. The display unit D may include a computer screen, laptop computer, tablet computer, smartphone, television, smart-eyewear, projector or other type of display medium available to those skilled in the art. An example display unit 210 is shown in and described below with respect to FIG. 3.

In the example shown in FIG. 1, the vehicle 12 includes four display units D1, D2, D3, D4 in proximity to respective seating positions 16, 18, 20, 22. The display units D1, D2, D3, D4 may be shared amongst several occupants or dedicated to a specific occupant. It is understood that the relative number of display units, the number of occupants and their orientation within the vehicle 12 may be varied based on the application at hand.

As described below, the display unit D may present text of other content, including but not limited to, navigation updates on screen to notify the occupant 14 of the next maneuver or position, estimated time of arrival, fuel level, planned stops, and other details. The relevant contextual conversations may be controlled by evaluating what is spoken as it relates to the media, occupant position, timing, etc.

The vehicle 12 may include at least one microphone 30 for dynamically capturing audio signals in or around the vehicle 12. As described below, the system 10 may enable transcription of active conversation among the vehicle occupants, using the audio data obtained by the microphone 30 and present the transcribed data onto a section of the display unit D. In the embodiment shown in FIG. 1. the vehicle 12 includes an additional microphone 32 at a different location in the vehicle 12. The number and location of the microphones may be varied.

In one embodiment, the controller C is embedded in the vehicle 12. If the vehicle 12 is part of a fleet, the controller C may be embedded in a master or leader vehicle. In another embodiment, the controller C may be hosted or based out of a remotely located cloud computing service 34, which may include one or more remote servers hosted on the Internet to store, manage, and process data.

Referring to FIG. 1, the vehicle 12 may include a telematics module 36 for establishing two-way communications between the controller C and the cloud computing service 34. The telematics module 36 may collect data from the microphones 30, 32 and telemetry data, such as location, speed, engine data, maintenance requirements and servicing, by interfacing with various internal sub-systems. The telematics module 36 may enable vehicle-to-vehicle (V2V) communication and/or a vehicle-to-everything (V2X) communication.

In some embodiments, referring to FIG. 1, the accessibility mode 50 may be controlled through a mobile application 38 that is embedded in a smart device (e.g., smart phone) belonging to an occupant of the vehicle 12. The circuitry and components of a mobile application ("apps") available to those skilled in the art may be employed.

Referring to FIG. 1, the vehicle 12 may establish communication with a remote advisory unit 40 through the telematics module 36 and/or the mobile application 38. The remote advisory unit 40 may provide subscription service-based communications such as in-vehicle services, turn-by-turn navigation, tracking and other services. In one embodiment, the remote advisory unit 40 is OnStar™. The remote advisory unit 40 may be manned electronically and/or by a remote advisor 42 having access to an electronic device 44 such as a desktop computer, laptop, tablet, cell phone or wearable device. The remote advisory unit 40 may include one or more servers that each include a processing device and a memory device and at least one database that includes vehicle information.

The system 10 may employ a wireless network 46 for communications to and from the vehicle 12, shown in FIG. 1. The wireless network 46 may be a short-range network or a long-range network. The wireless network 46 may be a communication BUS, which may be in the form of a serial Controller Area Network (CAN-BUS). The wireless network 46 may be a serial communication bus in the form of a local area network. The local area network may include, but is not limited to, a Controller Area Network (CAN), a Controller Area Network with Flexible Data Rate (CAN-FD), Ethernet, Bluetooth, WIFI and other forms of data. The wireless network 46 may be a Wireless Local Area Network (LAN) which links multiple devices using a wireless distribution method, a Wireless Metropolitan Area Network (MAN) which connects several wireless LANs or a Wireless Wide Area Network (WAN) which covers large areas such as neighboring towns and cities. Other types of network technologies or communication protocols available to those skilled in the art may be employed.

Figure 2:
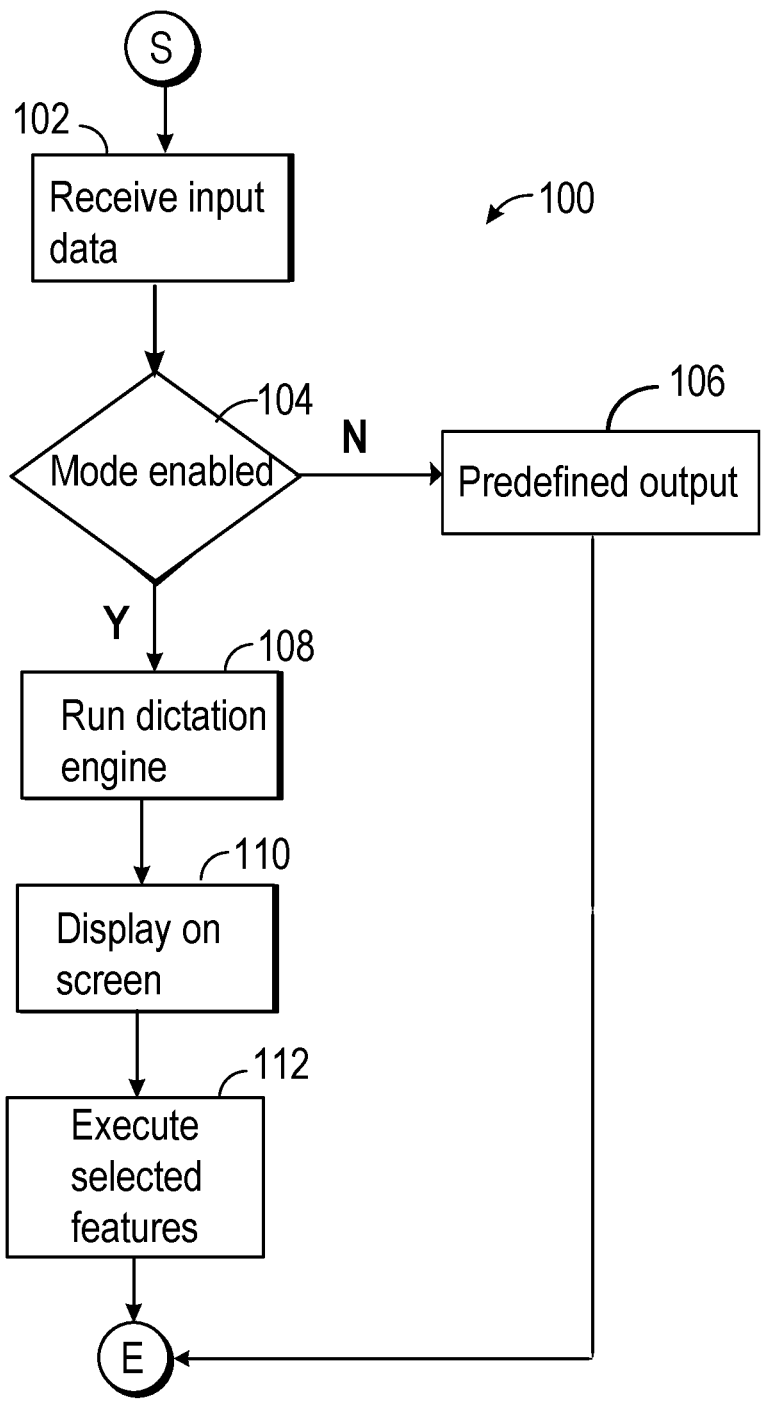
FIG. 2 is a flowchart for a method executable by the controller of FIG. 1.

Referring now to FIG. 2, a flowchart of an example method 100 of operating the system 10 is shown. Method 100 need not be applied in the specific order recited herein. Furthermore, it is to be understood that some blocks may be eliminated. In some embodiments, method 100 may be embodied as computer-readable code or stored instructions and may be at least partially executable by the controller C. The start and end of the method 100 are indicated by the letters "S" and "E."

Beginning at block 102 of FIG. 2, the controller C is adapted to receive audio input data from a plurality of sources. The audio input data may be differentiated by source. The plurality of sources may include a vehicle infotainment unit 52, a microphone 30 and other sub-components of the vehicle 12. The audio signal may originate from a video streaming service, the external environment (e.g., siren from a police vehicle driving by), or conversation amongst passengers in the vehicle 12. The microphone 30 may be selectively muted or activated based on input from one of the occupants 14 of the vehicle 12.

Advancing to block 104, the method 100 includes determining if the accessibility mode 50 is enabled. If the accessibility mode 50 is not enabled (block 104=NO), the method 100 advances to block 106, where the controller C is adapted to display the audio input data or media signal without subtitles and the method 100 is ended.

If the accessibility mode 50 is enabled (block 104=YES), the method 100 advances to block 108, where the controller C is adapted to execute a dictation engine 54 to generate respective transcribed data from the audio input data in real-time. The dictation engine 54 may employ artificial intelligence software and/or speech recognition technology to transcribe the audio signals into text. Transcribing includes converting an audio signal or recording to text format. The dictation engine 54 may incorporate a transcription service available to those skilled in the art, such as Android ASR and/or cloud speech services.

Figure 3:
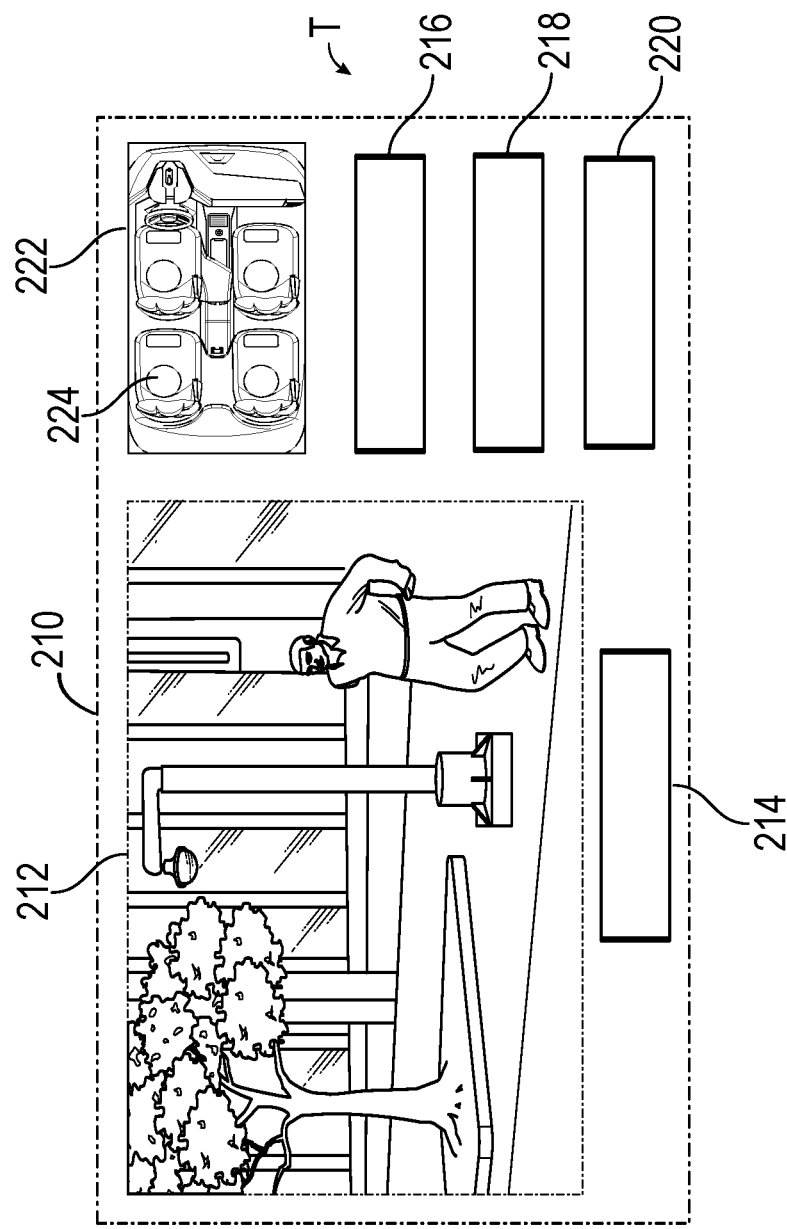
FIG. 3 is a schematic diagram of an example display unit that may be employed in the system of FIG. 1.

Proceeding from block 108 to block 110, the method 100 includes displaying the respective transcribed data in the display unit D in the vehicle 12 shown in FIG. 1. FIG. 3 shows an example display unit 210 that may be employed in the system 10. The display unit 210 includes multiple sections, including a frame or media screen 212 adapted to display video content chosen by the occupant 14 and a plurality of text boxes T.

Referring to FIG. 3, the plurality of text boxes T may include a media text box 214 that displays the text that is associated with the scene shown in the media screen 212, such as "David was about to cross the street when he heard a noise." The transcribed data may be integrated in a coherent stream using contextual information, such as matching the spoken comments to the video images on the media screen 212 in real time.

Referring to FIG. 3, the plurality of text boxes T may include a message text box 218 adapted to display messages from the controller C and/or accessibility mode 50, such as "This movie ends in thirty minutes, would you like to save your spot or push this to another device?" The controller C may provide system queues and relevant updates by associating vehicle sensor data with events associated with that data. This may include navigation notifications when speaking about destinations, estimated time of arrival, maneuvers, fluid levels, ranges, life percentages when discussing service needs, etc.

The plurality of text boxes T may include a navigation text box 216 for displaying vehicle route information and associated vehicle sensor data. The vehicle route information may include an upcoming navigation maneuver of the vehicle 12 (e.g., "turning right in 5 miles"), describing a planned stop and an estimated time of arrival of the vehicle at a predefined destination (e.g., "the coffee shop is 20 minutes away"). The vehicle route information may include a remaining power level of the vehicle 12 at the predefined destination or another location (e.g., "the battery level is estimated to be about 85% upon arrival at the coffee shop").

Referring to FIG. 3, the plurality of text boxes T may include a vehicle audio text box 220 for displaying captured in-vehicle audio conversation amongst the occupants of the vehicle 12 (e.g., "can you pass me the water bottle"). The occupants of the vehicle 12 (e.g., located at the respective seating positions 16, 18, 20, 22 in FIG. 1) may be pre-enrolled, identified and annotated in the respective transcribed data. The location of the occupants may be obtained through biometrics-based identification and adaptive beamforming. The microphone 30 may be location sensitive.

The controller C may identify the source of the conversation by displaying a vehicle layout overlay in a graphic inset 222 in the display unit 210 of FIG. 3. The graphic inset 222 may include symbols representing occupants, with the controller C updating the symbol in real time to show who is speaking. In other words, the occupants may be identified live on the display unit 210 through the graphic inset 222 showing an overview of the occupants in the vehicle 12. Each occupant may be have a circle represent their seating position. The speaking occupant 224 whose audio was captured may be identified with the circle (representing their seating position) changing colors or flashing when the occupant 224 is speaking versus when the occupant 224 is silent. The controller C may be adapted to chronologically arrange the conversations when more than one person is speaking.

The system 10 enables the occupants to be entertained in their driving or riding experience in multiple ways while being aware of current events or information. Each of the plurality of text boxes T may be updated from autogenerated vehicle sources and/or the cloud computing service 34. In some embodiments, a side bar conversation between occupants may be used to set up a reminder for an upcoming event, e.g., setting a reminder for an Ice Festival in downtown City X, on a specific date. Having a comprehensive display unit 210 as shown in FIG. 3, enables a "one stop" visual of multiple issues that are contextual while streaming the personal video content chosen by the occupant 14.

Advancing to block 112, the controller C is adapted to execute one or more predefined action features 56 selected by the occupant 14. The message text box 218 may display a message asking the occupant 14 to select one of the action features 56 (e.g., "would you like a summary of this podcast" or "would you like this content to be archived").

One of the action features 56 may include providing a summary or gist of the media content in one of the plurality of text boxes T. The media content may include a podcast, an interview or a documentary. The salient bullet points of the selected content may be generated using Natural Language Understanding, which is a branch of artificial intelligence that uses computer software to understand input in the form of sentences using text or speech. The controller C may incorporate artificial intelligence software to ingest the content and create a narrative once the broadcast is completed.

One of the action features 56 may include selectively archiving the respective transcribed data. Another of the action features 56 may include selectively transmitting the respective transcribed data to the remote advisory unit 40. In some embodiments, the transcribed data may be offboarded to other devices on demand, such as a personal smart device (e.g., through an app). In other words, the transcribed data may be stored, shared, paused, and summarized (e.g., in the form of bullet point summaries) for later reference.

In summary, the system 10 enables transcription of live streaming audio signal to text from various sources. Using in-vehicle audio from passengers, infotainment media, vehicle sensors, and other contextual data, the system 10 is adapted to overlay transcribed data from entertainment content, passenger conversations or comments, and vehicle/trip information to provide an enhanced experience for occupants of the vehicle 12.

The controller C of FIG. 1 includes a computer-readable medium (also referred to as a processor-readable medium), including a non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, other magnetic medium, a CD-ROM, DVD, other optical medium, a physical medium with patterns of holes, a RAM, a PROM, an EPROM, a FLASH-EEPROM, other memory chip or cartridge, or other medium from which a computer may read.

Look-up tables, databases, data repositories or other data stores described herein may include various kinds of mechanisms for storing, accessing, and retrieving various kinds of data, including a hierarchical database, a group of files in a file rechargeable energy storage system, an application database in a proprietary format, a relational database energy management system (RDBMS), etc. Each such data store may be included within a computing device employing a computer operating system such as one of those mentioned above and may be accessed via a network in one or more of a variety of manners. A file system may be accessible from a computer operating system and may include files stored in various formats. An RDBMS may employ the Structured Query Language (SQL) in addition to a language for creating, storing, editing, and executing stored procedures, such as the PL/SQL language mentioned above.

The flowcharts illustrate an architecture, functionality, and operation of possible implementations of systems, methods, and computer program products of various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by specific purpose hardware-based storage systems that perform the specified functions or acts, or combinations of specific purpose hardware and computer instructions. These computer program instructions may also be stored in a computer-readable medium that may direct a controller or other programmable data processing apparatus to function in a particular manner, such that the instructions stored in the computer-readable medium produce an article of manufacture including instructions to implement the function/act specified in the flowchart and/or block diagram blocks.

The numerical values of parameters (e.g., of quantities or conditions) in this specification, including the appended claims, are to be understood as being modified in each respective instance by the term "about" whether or not "about" actually appears before the numerical value. "About" indicates that the stated numerical value allows some slight imprecision (with some approach to exactness in the value; about or reasonably close to the value; nearly). If the imprecision provided by "about" is not otherwise understood in the art with this ordinary meaning, then "about" as used here indicates at least variations that may arise from ordinary methods of measuring and using such parameters. In addition, disclosure of ranges includes disclosure of each value and further divided ranges within the entire range. Each value within a range and the endpoints of a range are hereby disclosed as separate embodiments.

The detailed description and the drawings or FIGS. are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings, or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A system for providing hearing accessibility for an occupant in a vehicle, the system comprising:
   at least one display unit operatively connected to the vehicle, the at least one display unit having multiple sections, including a media screen adapted to display video content and a plurality of text boxes;
   a controller in electronic communication with the at least one display unit, the controller being adapted to selectively execute a dictation engine;
   wherein the controller has a processor and tangible, non-transitory memory on which instructions are recorded, the controller being adapted to:
      receive audio input data from a plurality of sources; and
      generate respective transcribed data from the audio input data in real-time, via the dictation engine, the respective transcribed data being displayed in the plurality of text boxes;
   wherein the plurality of sources includes at least one microphone adapted to capture the audio input data in or around the vehicle;
   wherein the plurality of text boxes includes a vehicle audio text box adapted to display the respective transcribed data based in part on the audio input data captured by the at least one microphone; and
   wherein the at least one microphone is adapted to be selectively muted or selectively activated based on input from the occupant.

2. The system of claim 1, wherein the plurality of text boxes includes a media text box adapted to display the respective transcribed data associated with the video content on the media screen.

3. The system of claim 1, wherein:
   the controller is adapted to display a vehicle layout overlay in the at least one display unit; and
   the vehicle layout overlay includes respective symbols representing occupants of the vehicle, the respective symbols are updated in real time to identify the occupants associated with the respective transcribed data in the vehicle audio text box.

4. The system of claim 1, wherein the plurality of text boxes includes a message text box adapted to display one or more messages from the controller requesting input from the occupant.

5. The system of claim 1, wherein the plurality of text boxes includes a navigation text box displaying vehicle route information, including an upcoming navigation maneuver of the vehicle and a planned stop.

6. The system of claim 5, wherein the vehicle route information includes an estimated time of arrival of the vehicle at a predefined destination and a remaining power level of the vehicle at the predefined destination.

7. The system of claim 1, wherein the controller is adapted to selectively transmit the respective transcribed data to a personal smart device and/or a remote advisory unit.

8. The system of claim 1, wherein the video content includes at least one of a podcast and a documentary, the controller being adapted to selectively display a summary of the video content in one of the plurality of text boxes.

9. The system of claim 1, wherein the controller is adapted to selectively archive the respective transcribed data.

10. A method of providing hearing accessibility for an occupant in a vehicle, the vehicle having at least one display unit, and a controller having a processor and tangible, non-transitory memory on which instructions are recorded, the method comprising:

incorporating multiple sections in the at least one display unit, including a media screen adapted to display video content and a plurality of text boxes;
receiving audio input data from a plurality of sources, via the controller;
selectively executing a dictation engine, via the controller, to generate respective transcribed data from the audio input data in real-time;
displaying the respective transcribed data in the plurality of text boxes;
incorporating at least one microphone in the plurality of sources and capturing the audio input data in or around the vehicle with the at least one microphone;
generating the respective transcribed data from the audio input data from the at least one microphone, via the dictation engine;
incorporating a vehicle audio text box in the plurality of text boxes, the respective transcribed data being displayed in the vehicle audio text box;
displaying a vehicle layout overlay in the at least one display unit, the vehicle layout overlay including respective symbols representing occupants of the vehicle; and
identifying the occupants linked with the respective transcribed data in the vehicle audio text box by updating the respective symbols in real time.

11. The method of claim 10, further comprising:
incorporating a message text box in the plurality of text boxes and displaying one or more messages from the controller in the message text box.

12. The method of claim 10, further comprising:
incorporating a navigation text box in the plurality of text boxes and displaying vehicle route information in the navigation text box, the vehicle route information including at least one of an upcoming navigation maneuver of the vehicle, a planned stop, an estimated time of arrival of the vehicle at a predefined destination and a remaining power level of the vehicle at the predefined destination.

13. The method of claim 10, further comprising:
selectively transmitting the respective transcribed data to a personal smart device, via the controller, and selectively archiving the respective transcribed data, via the controller.

14. The method of claim 10, further comprising:
selectively displaying a summary of the video content in one of the plurality of text boxes, via the controller, the video content being at least one of a podcast and a documentary.

15. A system for providing hearing accessibility for an occupant in a vehicle, the system comprising:
at least one display unit operatively connected to the vehicle, the at least one display unit having multiple sections, including a media screen adapted to display video content and a plurality of text boxes;
a controller in electronic communication with the at least one display unit, the controller being adapted to selectively execute a dictation engine;
wherein the plurality of text boxes includes a media text box adapted to display subtitles associated with the video content on the media screen; and
wherein the controller has a processor and tangible, non-transitory memory on which instructions are recorded, the controller being adapted to:
receive audio input data from a plurality of sources, including at least one microphone adapted to capture the audio input data in or around the vehicle;
generate respective transcribed data from the audio input data in real-time, via the dictation engine, the respective transcribed data being displayed in the plurality of text boxes;
display a vehicle layout overlay in the at least one display unit, the vehicle layout overlay including respective symbols representing occupants of the vehicle;
wherein the plurality of text boxes includes a vehicle audio text box adapted to display the respective transcribed data based in part on the audio input data captured by the at least one microphone; and
wherein the respective symbols are updated in real time to identify the occupants linked with the respective transcribed data in the vehicle audio text box.

16. The system of claim 15, wherein the plurality of text boxes includes:
a message text box adapted to display one or more messages from the controller requesting input from the occupant; and
a navigation text box displaying vehicle route information, including an upcoming navigation maneuver of the vehicle and a planned stop.

* * * * *